(12) United States Patent
Terry

(10) Patent No.: US 7,023,835 B2
(45) Date of Patent: Apr. 4, 2006

(54) SYNCHRONIZATION OF TIMING ADVANCE AND DEVIATION

(75) Inventor: Stephen E. Terry, North Port, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 956 days.

(21) Appl. No.: 09/826,464

(22) Filed: Apr. 5, 2001

(65) Prior Publication Data
US 2001/0036168 A1 Nov. 1, 2001

Related U.S. Application Data

(60) Provisional application No. 60/195,087, filed on Apr. 6, 2000.

(51) Int. Cl.
H04J 3/06 (2006.01)

(52) U.S. Cl. .................................. 370/350; 370/508

(58) Field of Classification Search ............... 370/280, 370/281, 350, 337, 347, 503, 508, 519; 455/436
See application file for complete search history.

(56) References Cited

U.S. PATENT DOCUMENTS

| | | | |
|---|---|---|---|
| 5,479,409 A | | 12/1995 | Dupuy et al. |
| 5,502,721 A | * | 3/1996 | Pohjakallio ................ 370/336 |
| 5,530,704 A | | 6/1996 | Gibbons et al. |
| 5,586,119 A | | 12/1996 | Scribano et al. |
| 5,872,820 A | * | 2/1999 | Upadrasta ................... 375/356 |
| 5,898,929 A | | 4/1999 | Haartsen |
| 6,094,421 A | * | 7/2000 | Scott .......................... 370/280 |
| 6,208,871 B1 | * | 3/2001 | Hall et al. .................. 455/517 |
| 6,385,452 B1 | * | 5/2002 | Zadeh et al. ................ 455/440 |
| 6,449,290 B1 | * | 9/2002 | Willars et al. .............. 370/507 |
| 6,470,024 B1 | | 10/2002 | Hamalainen et al. |
| 6,470,185 B1 | * | 10/2002 | Kangas et al. ........... 455/456.1 |
| 6,477,151 B1 | | 11/2002 | Oksala |
| 6,526,039 B1 | * | 2/2003 | Dahlman et al. ........... 370/350 |
| 6,553,230 B1 | * | 4/2003 | Plestid et al. ............... 455/436 |
| 6,633,559 B1 | | 10/2003 | Asokan et al. |
| 6,665,289 B1 | | 12/2003 | Sebire et al. |
| 6,711,149 B1 | | 3/2004 | Yano et al. |
| 2001/0046240 A1 | | 11/2001 | Longoni et al. |

FOREIGN PATENT DOCUMENTS

| | | |
|---|---|---|
| EP | 0 474 138 B1 | 8/1991 |
| EP | 0474138 B1 | 8/1991 |
| EP | 0 474 138 A2 | 3/1992 |

\* cited by examiner

*Primary Examiner*—John Pezzlo
*Assistant Examiner*—Dmitry Levitan
(74) *Attorney, Agent, or Firm*—Volpe and Koenig, P.C.

(57) ABSTRACT

A system and method for reducing the latency from timing deviation (TD) measurement to time advance (TA) adjustment. The invention uses a deterministic procedure to coordinate time advance (TA) commands and timing deviation (TD) measurements so that failed transmissions or mobile terminals signal propagation changes can be recognized and corrected much more rapidly. Radio resource efficiency is maximized by minimizing signaling overhead through effectively reducing the frequency of time advance commands. This is accomplished by using TA command signals which include a Connect Frame Number (CFN) to specify particular radio frames for time advance (TA) adjustment. The potential for timing deviation (TD) measurements to be incorrectly processed in conjunction with adjusting a physical reception window and calculating mobile termination location is minimized, without excessive command signaling requirements.

17 Claims, 6 Drawing Sheets

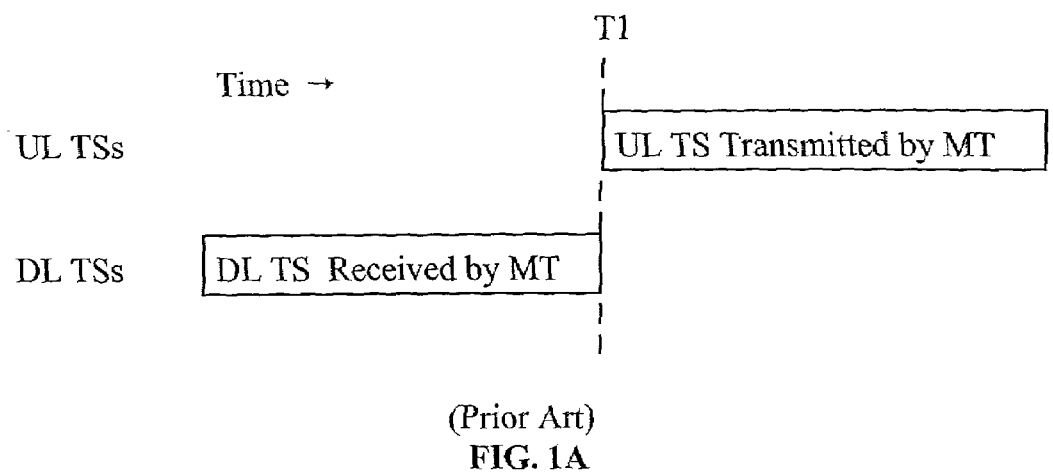
(Prior Art)
FIG. 1A
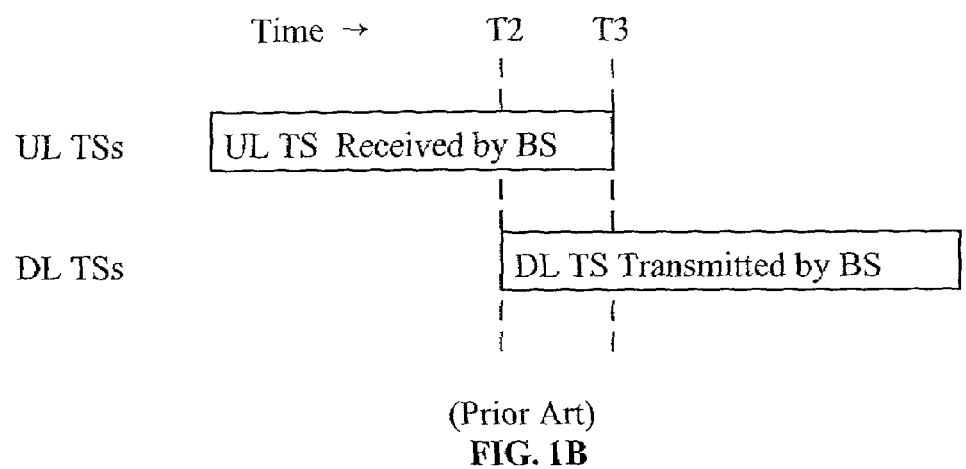
(Prior Art)
FIG. 1B

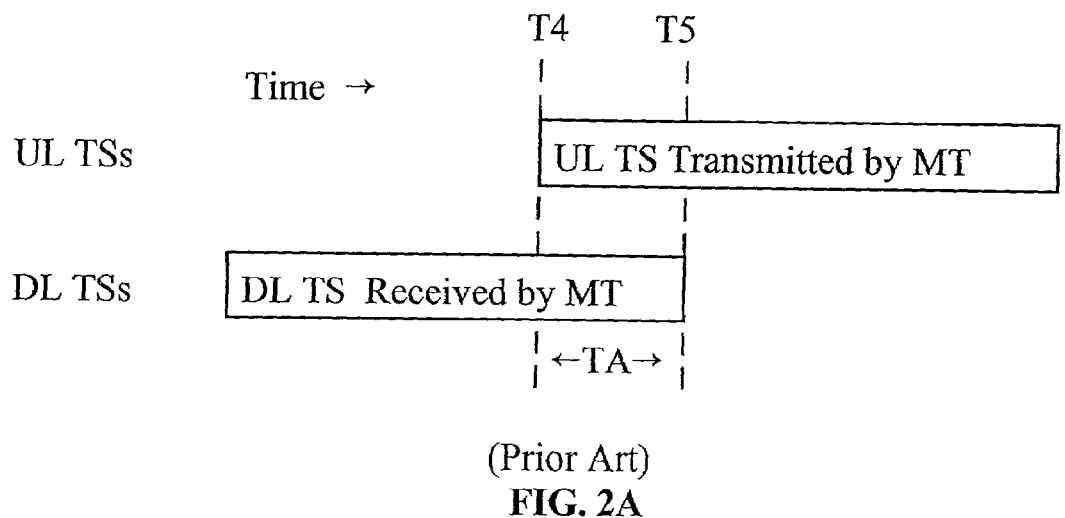
(Prior Art)
FIG. 2A
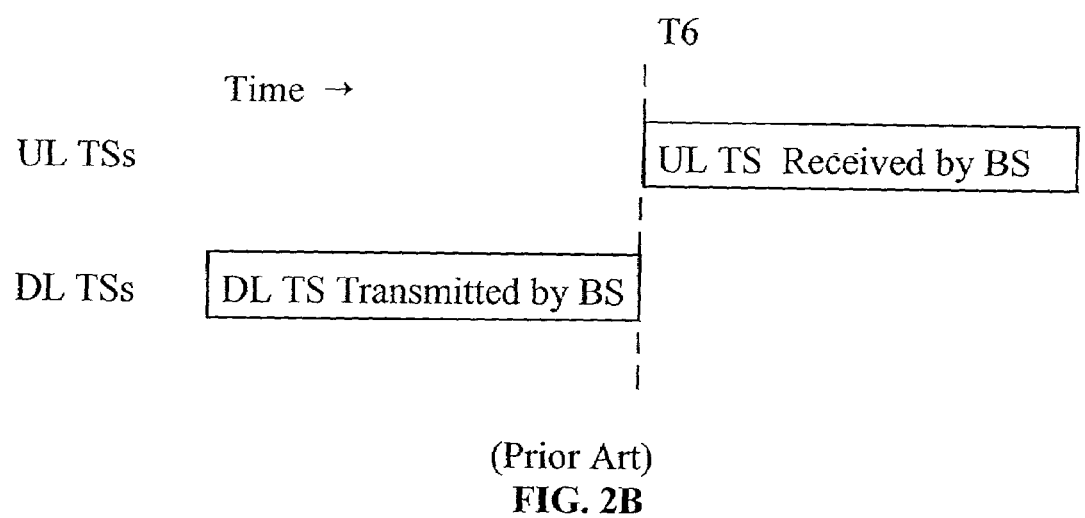
(Prior Art)
FIG. 2B

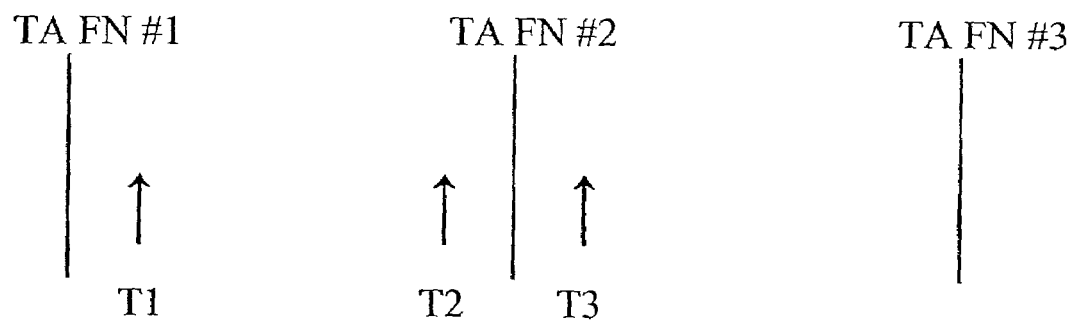
(Prior Art)
FIG. 3
(Prior Art)
FIG. 4

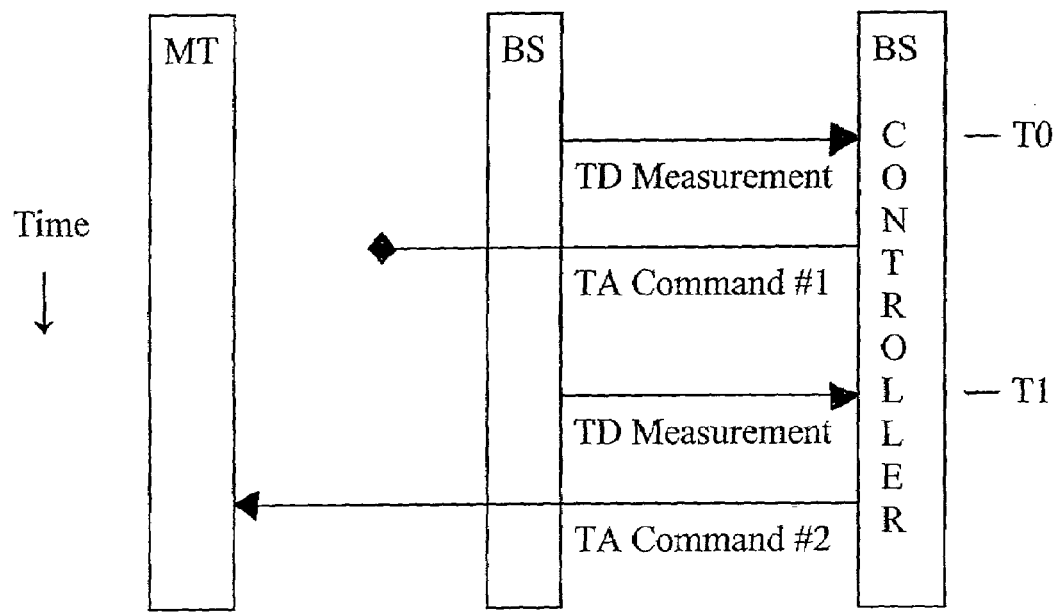
(Prior Art)
FIG. 5
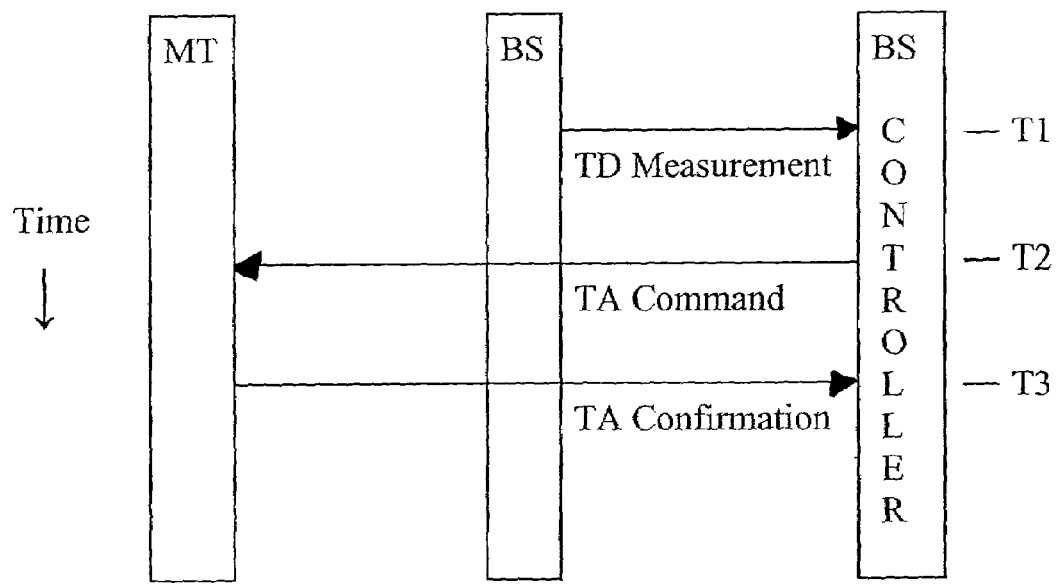
(Prior Art)
FIG. 6

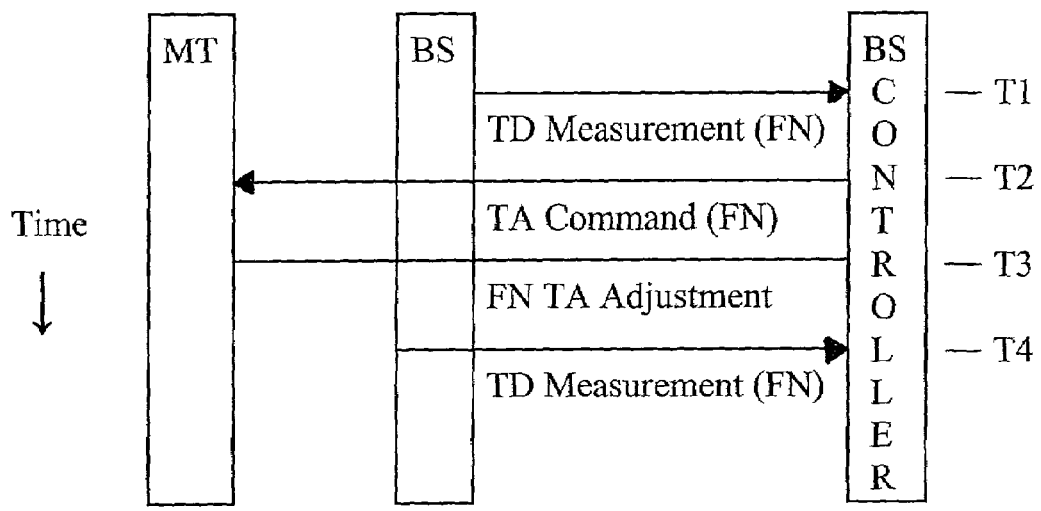
FIG. 7
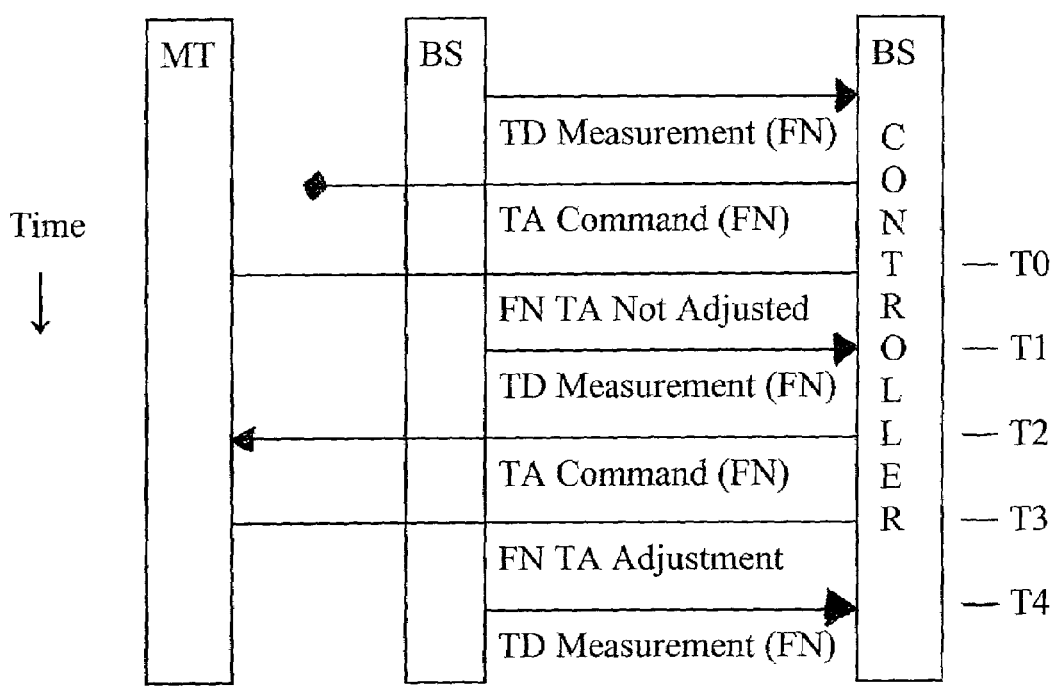
FIG. 8

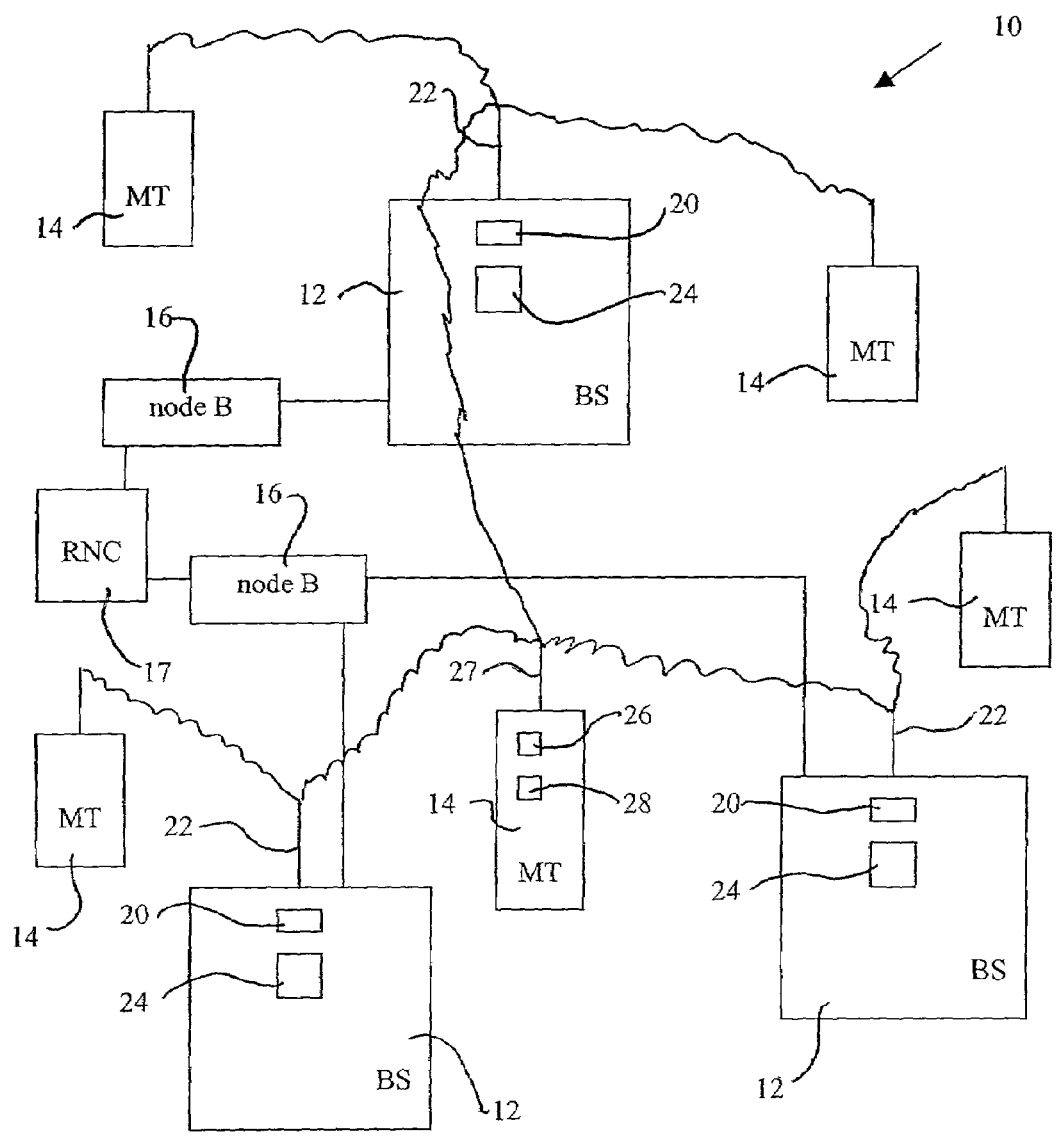
FIG. 9

SYNCHRONIZATION OF TIMING ADVANCE AND DEVIATION

This application claims priority from U.S. Provisional Application No. 60/195,087 filed Apr. 6, 2000.

The present invention relates generally to digital communication systems. More specifically, the invention relates to a system and method for synchronizing uplink and downlink transmissions for time division duplex and time division multiple access protocols to compensate for radio propagation delays. As an additional benefit, the systems facilitate geographic location of mobile terminals.

BACKGROUND

In the proposed $3^{rd}$ generation (3G) wireless protocols, time division duplex (TDD) and time division multiple access (TDMA) methods divide an allocated radio spectrum into repetitive time periods known as radio frames which are uniquely identified by a sequential cell frame number (FN). Each radio frame is further subdivided into a plurality of unique, numbered time slots (TS) which are individually assigned for uplink (UL) or downlink (DL) transmission.

Radio transmissions incur a propagation delay relative to the distance from a transmitter to a receiver. In mobile cellular communication systems, these delays vary over time as the distance between a mobile terminal (MT) and a base station (BS) changes. In order to receive communication transmissions without error, the time of reception must be known to the receiver.

To compensate for varying propagation delays and to maintain a known time of reception, the time of transmission is periodically adjusted. The transmission timing adjustment is performed in the MT rather than the BS since many MT's are supported by a common BS and the propagation delay for each MT is different depending upon distance. The BS downlink radio frame transmissions do not vary over time and are used by an MT to synchronize uplink radio frame transmissions.

The MT synchronizes to a BS downlink transmission that has incurred a propagation delay. The MT uplink transmission also incurs a propagation delay approximately equal to the downlink propagation delay. The uplink transmission received in the BS is the sum of the downlink and uplink propagation delays. Radio frame reception (DL) and reply transmission (UL) at a MT before any timing adjustment is performed is shown in FIG. 1a. FIG. 1a illustrates a BS transmitted DL time slot (TS) received by the MT immediately followed by a MT transmitted UL time slot (TS). Radio frame transmission (DL) and reception (UL) at a base station before any timing adjustment is performed is shown in FIG. 1b. FIG. 1b illustrates one MT transmitted UL time slot immediately followed by a BS transmitted DL time slot.

As reflected in FIG. 1a, the MT synchronizes on the downlink time slot reception at a time T1 and initiates its uplink transmission immediately thereafter. As shown in FIG. 1b, the start of the downlink time slot (TS) transmission by the BS occurs at time T2 and the end of a preceding uplink time slot (TS) received by the BS occurs at time T3. The difference between times T3 and T2 is referred to as timing deviation (TD) and is equal to the sum of the uplink and downlink propagation delays.

The TD can be identified and used to command the MT to adjust the uplink time slot transmission time in order to synchronize uplink transmission with downlink reception at the BS. Since the MT is synchronized to a received downlink time slot that has already incurred a downlink propagation delay, the MT must advance transmission of uplink time slots by the TD sum of uplink and downlink propagation delays. This is referred to as timing advance (TA) defined as:

$$T3-T2=TD=UL \text{ propagation delay}+DL \text{ propagation delay}=TA \quad \text{Equation 1}$$

Radio frame reception (DL) and reply transmission at an MT after the TA adjustment is shown in FIG. 2a. FIG. 2a shows a BS transmitted DL time slot followed by a time advanced MT transmitted UL time slot at the MT. Radio frame transmission (DL) and reception (UL) at the base station after TA adjustment of the transmission is shown in FIG. 2b. FIG. 2b shows one BS transmitted DL time slot immediately followed by a time advanced MT transmitted UL time slot as received at the BS.

The MT has advanced the UL time slot transmission according to the TA command from time T5 to time T4. Since the received time slot at time T5 has already incurred the DL propagation delay, the new MT time slot transmission time T4 synchronizes the reception time T6 of the BS received UL time slot advanced by the expected UL propagation delay.

$$T4=T5-TA \text{ (sum of } UL \text{ and } DL \text{ propagation delays)} \quad \text{Equation 2}$$

$$T5=T6 \text{ (} BS \text{ next time slot)}+DL \text{ propagation delay} \quad \text{Equation 3}$$

$$T4=T6 \text{ (} BS \text{ next time slot)}-UL \text{ propagation delay} \quad \text{Equation 4}$$

Accordingly, the TA adjustment of the MT transmissions results in synchronization of UL and DL time slots at the BS.

A BS controller is responsible for instructing the MT to adjust the uplink transmission according to the calculated TA. MT commands for TA adjustment generated by the BS controller may require considerable physical resources, it is important for the BS controller to generate TA adjustment commands as infrequently as possible to minimize signaling overhead.

This is facilitated by using small guard period (GP) with respect to the time slot duration, within each radio frame between transmitted data of each time slot. A conventional time slot structure is shown in FIG. 3. The GP avoids simultaneous transmission and reception in either the BS or MT. A "physical reception window" of operation, which is substantially smaller than the GP, dictates the allowed timing deviation. The physical reception window shifts within the GP as MT propagation delay changes.

The measured TD reflects the location of the physical reception window within the GP. The TA provides a corrective shift of the physical reception window within the GP. It is important to synchronize the TA adjustment in the MT and BS, since the BS reception window shifts as well. Conventionally, the BS controller continuously monitors the TD for each MT independently and generates TA commands in advance of the allowed physical reception window being exceeded.

The logic used to generate TA commands infrequently must also take into account the possibility that radio transmission failures can cause TA commands not to be received by the MT. This requires a fast and deterministic way to recognize when the MT has not performed the TA adjustment.

The TD and TA can additionally be used to determine the location of MTs. Since the propagation delay is equatable to the distance between an MT and a BS, the TDs from several BSs for a particular MT can be used to calculate by triangulation the MT location.

In order to produce accurate TA signals in connection with maintaining the reception window, minimizing signaling overhead and geolocation, it is important to know the TA for the time slot the TD was measured. Applicant has recognized that one method to accomplish this is only to allow the TA to take affect in the MT on specifically identified frames.

The need to coordinate TA adjustment in the MT and TD measurement in the BS to a specific sequential radio frame is difficult since the time of reception and processing in the MT of the BS generated TA command is not known to the BS controller. One conventional method is to only allow adjustments on periodic frame boundaries. Since the radio frames are sequentially numbered, periodic sequential frame numbers are conventionally used. However, the period needs to be excessively large to guarantee that the TA command can be processed in advance of the next periodic TD measurement.

To determine the TA frame number period necessary to coordinate the process, the worst case latency between BS controller generation of the TA command to MT processing must be used. This is the minimum period necessary to guarantee TA adjustment on the next TA frame number. For this case, the BS controller needs to initiate the procedure immediately following the previous TA frame number period. This effectively results in a TA adjustment delay of up to two TA sequential frame number periods.

As shown in FIG. 4, the worst case latency from BS generation to MT processing of the TA adjustment command is the time between TA frame numbers. The BS may determine a TA command needs to be generated some time (T1) after TA frame number 1 and a time (T2) before TA frame number 2. To guarantee coordination of the time the TA will take effect between the MT and BS, the BS must wait for the previous TA frame number period to expire to generate the request at time (T3). The result is when the TA requirement is recognized at time T1 the delay to coordinate the TA adjustment is greater than one frame number TA period, and at time T2 the delay is less the two frame number TA periods.

$$(FN\ TA\ \text{period}) < (\text{actual time to adjust } TA) < (2(FN\ TA\ \text{period})) \qquad \text{Equation 5}$$

Applicant has recognized that this methodology for TA coordination using specified frame number TA periods results in excessive TA delays that can be avoided. For example, excessive delays can arise due to the potential for failed radio transmissions. In this case it is necessary to recognize the failed transmission in the BS controller as quickly as possible so that a new TA adjustment command can be regenerated. Using the frame number TA period method, the BS Controller will wait for subsequent TD measurements following an expected TA adjustment to determine if a TA command needs to be regenerated. This case is shown in FIG. 5.

In this prior art example, the BS controller, after receiving a TD for correction at a time T0, must wait for a subsequent TD measurement at time T1 that indicates the TA adjustment did not take effect. The difficulty with this signaling method is that the BS controller does not know exactly which TD measurement identifies the TA adjustment failure. As a result, the BS controller in order to minimize TA commands must wait for the worst case TA adjustment delay before regenerating a TA command base on the received TD measurement.

Another prior art solution has the MT confirm each TA command as shown in FIG. 6. For this example, a timeout on the TA confirmation will result in retransmission of the TA command. The TA adjustment failure will be recognized faster then waiting for the TA frame number period to expire. However, this faster recovery requires approximately twice as much signaling since every command is confirmed. This is undesirable, since a primary objective is to reduce the TA command frequency.

Accordingly, there exists a need for a system and method that allows for fast and efficient radio frame timing adjustment without excessive command signaling requirements.

SUMMARY

The present invention is directed to a system and method for reducing the latency from timing deviation (TD) measurement to time advance (TA) adjustment. The invention uses a deterministic procedure to coordinate time advance (TA) commands and timing deviation (TD) measurements so that failed transmissions or mobile terminals signal propagation changes can be recognized and corrected much more rapidly. Radio resource efficiency is maximized by minimizing signaling overhead through effectively reducing the frequency of time advance commands. This is accomplished by specifying particular radio frames for time advance (TA) adjustment by including a Connect Frame Number (CFN) in TA commands. The potential for timing deviation (TD) measurements to be incorrectly processed is then minimized since the TD measurement made in the BS for the CFN specified radio frame, in which the TA adjustment was to be made by the MT, will reflect whether or not the TA was actually adjusted.

A preferred communication system supports base station (BS)/mobile terminal (MT) wireless bi-directional communications via the utilization of a radio frame format having sequentially numbered system radio frames. System BSs have a transmitter for transmitting selectively formatted communication data to MTs within system radio frames and a receiver for receiving communication data from MTs within system radio frames. The BS receivers have an associated processor for measuring timing deviation (TD) in identified radio frames of communication data received from a selected MT.

Typically, TD measurement is monitored for all radio frames. The BS processor associates the respective sequential frame number with each TD measurement of transmissions received in a radio frame thereby establishing a time associated with each measurement. Timing advance (TA) commands are generated by a base station controller that is associated with the BSs for providing TA adjustment commands for transmission by the BSs to the MTs. The TA adjustment command generator generates TA adjustment commands which include the TA adjustment value, calculated based upon the most recent successful TA command's adjustment and a measured TD for a selected MT. TA adjustment commands also include a Connection Frame Number (CFN) specifying a particular radio frame in which the selected MT is to make the timing adjustment.

It is preferred that the TA signal generator only generates a TA signal for a selected MT when the measured TD of a transmission received from the selected MT does not fall within a selected timing synchronization range, i.e. a TD threshold. Such a TD threshold is preferably selected to correlate with the physical reception window of the MTs and BSs.

After the BS controller transmits a TA adjustment command to a selected MT, the TD measured for communication data received from the selected MT in the frame specified in the CFN of the transmitted TA command signal is analyzed to determine if the TA adjustment has been made or if a new TA command is required. Normally, a new TA command will be immediately required only if the prior TA command did not successfully TA adjust the selected MT. Otherwise the TD measurement for the CFN frame should be changed by substantially the same amount which the TA command was to effect and should fall within the TD threshold.

Preferred mobile terminals (MTs) have a transmitter and an associated MT processor for transmitting selectively formatted communication data to the BSs within system radio frames synchronized by the MT processor and a receiver for receiving communication data from the BSs within system radio frames. The MT processor adjust the timing of the transmissions of the associated MT transmitter in response to TA data in a received TA adjustment command commencing in the radio frame specified in the CFN of the received TA command.

The communication system preferably also includes a geographic locator associated with the BSs for determining the physical location of the MTs. In using conventional triangulation, two or more BSs measures TDs with respect to communication data received from a selected MT in a specified system radio frame. However, using the TD measurements alone to calculate MT geographic location will not produce an accurate result if the MT signal has been TA adjusted. With the present invention, the TA of the MTs' transmissions are known for virtually all radio frames, since the actual TA is the TA of the most recent TA command signal successfully sent to the MT. Since the TD for each CFN specified radio frame is evaluated, failure of a TA command is known as soon as the meassured TD for the CFN frame is checked which is nearly instantaneously. For a successful TA command, its TA value is used in geolocation calculations for the frame specified by its CFN and all subsequent frames until a CFN identified frame of the next successful TA command. Thus, geographic location calculations may be made with respect to any radio frame based on TA command data which is known to have been effectuated.

The invention also provides a method of synchronizing communication data at the BSs. Timing Deviation (TD) is measured in identified radio frames in which communication data is received from a selected MT by a BS. If the measured TD of a transmission received from the selected MT does not fall within a selected timing synchronization range, a TA command signal is generated. The TA command signal includes TA data calculated based upon the measured TD. The TA command signal also includes a Connect Frame Number CFN specifying a particular radio frame for effectuating a timing adjustment by the selected MT. The TA command signal is transmitted to the selected MT. If the TA signal is then received by the selected MT, the timing of the communication data transmissions of the selected MT is adjusted based on the TA data and commencing in the CFN specified radio frame of the received TA command signal. The TD for data received from the selected MT to which the TA command signal had been transmitted is checked for the radio frame specified in the CFN of the transmitted TA command signal to assure the TA command was effected in the selected MT. Preferably, the TA command signal generation, transmission and the associated TD checking is repeated when the TD of a transmission received from the selected MT in the CFN radio frame does not fall within a selected timing synchronization range or is not changed by an amount virtually equal to the TA adjustment, since this would indicate a failure of the selected MT to implement the previously transmitted TA command.

The invention also facilitates a method of geographically locating a mobile terminal (MT) in a communication system. The method comprises effecting MT timing adjustments by communicating timing advance (TA) command signals to a selected MT, when a measured TD of a signal received by a BS from the selected MT exceeds a TD threshold. The TA command signals including TA data and a Connect Frame Number CFN specifying a particular radio frame. Timing Adjustment of communication data transmissions by the selected MT are made based on the TA data of a TA command signal in the CFN specified radio frame. The TD for communication data received from the selected MT in the CFN specified radio frame of a TA command signal is checked to determine whether the respective TA command signal was successfully effected by the selected MT, thereby assuring the actual TA of the selected MT is known. Measured timing deviation (TD) of a transmission received for a selected radio frame from a selected MT one or more BSs is collected. The TA data of the most recent successful TA command signal and the TD measurements by the BSs for the selected radio frame are used to calculate the geographic location of the selected MT.

Other objects and advantages of the system and method will become apparent to those skilled in the art after reading the detailed description of the invention.

BRIEF DESCRIPTION OF THE DRAWING(S)

FIG. 1a is a schematic timing diagram of radio frame reception and transmission at a mobile terminal without any timing adjustment.

FIG. 1b is a schematic timing diagram of radio frame reception and transmission at a base station without any timing adjustment.

FIG. 2a is a schematic timing diagram of radio frame reception and transmission at a mobile terminal with timing advance.

FIG. 2b is a schematic timing diagram of radio frame reception and transmission at a base station with a timing advance adjustment.

FIG. 3 is an illustration of a conventional time slot data and guard period structure.

FIG. 4 is a timing diagram of a conventional time adjustment method based on periodic frame number.

FIG. 5 is a timing diagram of timing adjustment command failure and retransmission under the conventional method illustrated in FIG. 4.

FIG. 6 is a timing diagram of an alternative conventional method of timing adjustment utilizing command confirmation signaling.

FIG. 7 is a timing diagram of frame number synchronized time delay measurement and timing adjustment in accordance with the teachings of the present invention.

FIG. 8 is a timing diagram of recovery from failed timing adjustment in accordance with the teachings of the present invention FIG. 9 is a schematic diagram of a communicating system made in accordance with the teachings of the present invention.

DETAILED DESCRIPTION OF THE PREFERRED EMBODIMENT(S)

The embodiments will be described with reference to the drawing figures where like numerals represent like elements throughout.

Referring to FIG. 9, there is illustrated a communication system 10 comprising a plurality of base stations (BSs) 12 which conduct wireless communication with mobile terminals (MTs) 14. Each BS conducts wireless communications with MTs in a geographic cell, which cell areas normally have some overlap. Where an MT 14 is in an overlap area, bi-directional communication is generally conducted by the BS having the strongest signal link with the MT. Where a second BS begins to have a stronger signal link, "hand off" of the communication occurs. Desired parameters and procedures for effectuating "hand off" are well known in the art.

In a preferred system such as in accordance with 3G wireless protocols, node Bs 16 are provided in a physical or logical connection with the one or more BSs. A radio network controller (RNC)17, to which the node Bs 16 are connected, controls the BSs and coordinates communications over the communication system 10. Multiple RNC's 17 coordinate communications for different BS groups in an extended system. The RNC 17 includes a BS controller which controls the BSs within the node Bs. Preferably the RNC 17 includes an MT geographic locator, but it is not required that the geographic locator be implemented in the RNC 17.

Each BS 12 preferably includes a transceiver 20 with an associated antenna system 22 and BS signal processing circuitry 24. Each MT 14 preferably includes a transceiver 26 with an associated antenna 27 and MT signal processing circuitry 28. In lieu of transceivers, BS and MT transmitters and receivers may be embodied as separate components.

Downlink communications (DL) are processed by the BS processing circuitry 24 and transmitted via the BS transceivers 20 from the BS antenna systems 22 for reception by the MTs 14. Uplink communications (UL) are transmitted from the MTs 14 and received via the BS antenna systems 22 and BS transceivers 20 of the base stations 12.

The BS processing circuitry 24 implements the formatting of wireless BS/MT communications into a selected radio frame format having multiple time slots, which format is used on a system wide basis for all BSs controlled by the RNC 17. Preferably, the RNC and node Bs coordinate this implementation.

Within the radio frame format, each radio frame is assigned a sequential number which enables the processing circuitry to identify specific system frames in the wireless BS/MT communications. The BS circuitry 24 is configured to measure received time delays (TDs) such that each TD measurement is identified with the respective radio frame of a received MT transmissions, i.e. uplink communications. The sequential frame numbers of the radio frames are used for this purpose.

The BSs provide TD data to the BS controller of the RNC 17 which preferably includes TD measurement data recorded at the BSs, identification of the MT which made the measured UL transmission and the system radio frame number in which the measured UL transmission was received. When the TD measurement data exceeds a specified threshold, the BS controller generates a TA command for the respective MT. A conventional intelligent algorithm is used to determine direction and speed of the MT with respect the measuring BS based upon TD measurement.

Preferably, the communication time slots have a guard period of a predetermined length within which a physical reception window moves. The TD threshold is preferably slightly shorter than the physical reception window and takes into account failed adjustments and time to detect failure and retry adjustment.

An initial TD measurement $TD_0$ reflects the initial position of the physical reception window within the GP for a particular MT before any TA adjustment. An initial TA, $TA_0$, is made at the MT which, assuming $TA_0$ is successful, relocates the physical reception window to a desired location reflected by a new timing deviation measurement $TD_1$. The initial TA, $TA_0$, was successful if $TD_1+TA_0$ is virtually equal to $TD_0$.

The TA of the MT transmission remains constant until the next successful TA adjustment as reflected by the measured TD. For example, an initial successful command $TA_0$ could set the frame advance of the MT transmission to 8 units, a next TA command $TA_1$ could command the advance the MT transmission to be changed to 3 units. The success of $TA_1$ would be reflected in a retardation of the measured TD of a received MT transmission of 5 units. If $TA_1$ was not successfully implemented, the TA of the MT transmissions would remain at 8 units.

To establish the time when TA adjustments take place, TA commands according to the invention specify a particular radio frame when the TA adjustment is to be made by the MT. Thus, each TA command signal includes TA data and a Connect Frame Number (CFN) which specifies a particular radio frame in which the MT will effectuate a TA command.

Upon determining TA adjustment is necessary, the BS controller generates a TA command signal without incurring the delay required for the prior art periodic TA frame number based adjustment method such as discussed in connection with prior art FIG. 4. Each TA command sent to the MT indicates a specific frame identified by the CFN when the MT will perform the TA adjustment. As illustrated in the signaling flow diagram shown in FIG. 7, when the BS controller determines TA adjustment is necessary, based on received TD measurements at time T1, a TA command is immediately generated. Only an extremely short BS controller processing delay is incurred so time T1 is approximately equal to time T2. The TA command includes a CFN specifying the particular radio frame at a time T3, when the MT performs the TA as illustrated in FIG. 7. The CFN is selected so that TA adjustment is applied at a time accounting for the expected BS controller to MT propagation and MT processing delay and that the CFN identified frame as transmitted by the MT will arrive at the BS with a corrected TD.

Since the BS controller specified the frame number in which the TA adjustment was to occur, a TD measurement at T4 conducted by the BS for the CFN specified time slot as received at the BS indicates to the BS controller if the TA was successfully performed by the MT. If TD of the CFN frame received at the BS is changed by substantially the adjustment to the timing which was to be effected by the TA command signal, the TA command was successful. If not, the BS controller can very quickly react to failed TA command transmissions and, also, can act to readjust MTs that have considerably changed distance from the BS since time T1 by issuing a new TA command signal.

The case of a failed TA adjustment command is shown in FIG. 8. The TA command has not been processed by the MT, so that a TA adjusted signal is not transmitted in the CFN frame at T0 by the MT. The TD measurement at the BS at time T1 on the CFN frame specified in the TA command, accordingly, does not indicate the TA adjustment has taken place. The base station controller then generates a new TA command at time T2. Since a deterministic method has been used to synchronize TA adjustment to a known frame number by the MT and BS controller, very little time is needed to generate the new TA command signal. Thus, time T2 is approximately equal to time T1.

The ability for the BS controller to react immediately upon reception of the TD measurement on the frame number specified in the previous TA command allows more time to generate TA commands without exceeding the physical channel reception window or overwriting the neighboring time slot guard period. This results in lowering the required frequency of TA commands and correspondingly reduces the physical resources required to support the TA signaling function.

The invention additionally allows for the case of a MT that has changed distance with respect to the BS to be quickly distinguished from the failed TA command case. Since the BS controller specifies via the CFN the particular radio frame a TA is to take effect, the TD measurement received for that particular radio frame will indicate if the TA command was correctly received and performed by the MT. Accordingly, TD measurements outside the specified threshold occurring in the CFN specified time frames will normally indicate failed TA commands, while such TD measurements in other time frames will normally indicate a change in MT location. Even where the TD measurement of a received CFN specified time frame is attributable to MT relocation, the new TA signal is generated based on that TD measurement to produce an accurate TA for the MT. This is an important capability since the BS controller is aware of is a previously failed TA command adjustment so that a complete adjustment can be made avoiding the need to repeat the failed TA command.

For geolocation, the geolocator can employ triangulation of received signals from a selected MT by several BSs with a higher degree of reliability. Where a selected MT is in communication with a BS for conducting normal telecommunications, that BS normally transmits the TA command signals generated by the BS controller to the selected MT. Since in accordance with the invention, the TA of MT transmissions is known for all radio frames, the geographic location can be easily calculated by conventional triangulation methods utilizing the known location of the BS, the TA data of most recent successful TA command signal (or 0 where no TA commands have been successful), and TD measurements from one or more BSs. While it is possible to provide geographic location based using triangulation upon the TA, the TD measurements from two BSs, unambiguous geographic location information via conventional triangulation is provided where TD measurements are obtained from at least three BSs.

In TDD systems where there is only communication with one BS, the MT also measures relative frame reception difference between cells. The cell reception difference measurements combined with distance from the current cell as reflected by the TD measured at the BS allows for geographic location determination in such systems based on the TA of the MT and the single BS TD measurement. It is also known to use pathloss measurements in such calculations.

Preferably, when a geographic location request is received, the geographic locator specifies a system time frame in which BS TD measurement of received transmissions from the selected MT is collected from the BS in primary communication with the selected MT, in a TDD system, and, in a conventional BS triangulation system, also from one or more other BSs. The geolocation is calculated based upon the TD measurements gathered for the specified time frame and the TA reflected by the most recent successful TA command effected by the selected MT. Accordingly, accurate geographic location of MTs can be performed virtually at all times since the TA of the selected MT is known from the TA command signals which have been successful as determined in accordance with this invention.

While the present invention has been described in terms of the preferred embodiments, other variations which are within the scope of the invention as outlined in the claims below will be apparent to those skilled in the art.

What is claimed is:

1. A communication system for supporting base station (BS)/mobile terminal (MT) wireless bi-directional communications via utilization of a radio frame format defined by radio frames that include a numeric identifying designation comprising:
 a BS having:
  a transmitter configured to transmit selectively formatted communication data to MTs within system radio frames, and
  a receiver configured to receive communication data from MTs within system radio frames;
 said BS receiver having an associated processor configured to measure timing deviation (TD) of received radio frames in which communication data is received from a selected MT;
 a timing advance (TA) signal generator associated with said BS configured to provide TA command signals for transmission by said BS to selected MTs;
 said TA command signal generator configured to generate TA command signals which include:
  TA data which is calculated based upon measured TD in a received radio frame for a selected MT, and
  a Connect Frame Number (CFN) specifying a particular radio frame for effectuating a timing adjustment by the selected MT; and
 said BS processor configured to measure the TD for communication data received from a selected MT to which a TA command signal had been transmitted in the frame specified in the CFN of the transmitted TA command signal.

2. A communication system according to claim 1 wherein:
 said TA command signal generator is configured to only generate a TA command signal for a selected MT when a measured TD of a transmission received from the selected MT does not fall within a selected timing synchronization range.

3. A communication system according to claim 1 further comprising:
 at least one mobile terminal (MT) having:
  a transmitter and an associated MT processor configured to transmit selectively formatted communication data to a BS within system radio frames synchronized by said MT processor; and
  a receiver configured to receive communication data from a BS within system radio frames; and
 said MT processor configured to adjust the timing of the communication date transmitted by said MT transmitter in response to TA data in a received TA command signal commencing in the radio frame specified in the CFN of the received TA command signal.

4. A communication system according to claim 3 wherein:
 said TA signal generator is configured to only generate a TA signal for a selected MT when the identified TD of a transmission received from the selected MT does not fall within a selected timing synchronization range.

5. A communication system according to claim 3 wherein:
 said TA command signal generator is configured to only generate a TA command signal for a selected MT when the measured TD of a transmission received from the selected MT does not fall within a selected timing synchronization range.

6. A communication system according to claim 1 further comprising:
   a plurality of base stations (BSs), each having:
      a transmitter configured to transmit selectively formatted communication data to MTs within system radio frames, and
      a receiver configured to receive communication data from MTs within system radio frames;
   each said BS receiver having an associated processor configured to measure a timing deviation (TD) of received MT transmissions in identified radio frames in which communication data is received from selected MTs;
   said timing advance (TA) command signal generator associated with each said BS configured to provide each said BS selected TA command signals for transmission to respective selected MTs; and
   each said BS processor configured to measure the TD for communication data received from a respective selected MT to which a respective TA command signal had been transmitted in the frame specified in the CFN of the respective transmitted TA command signal.

7. A communication system according to claim 6 wherein:
   said TA command signal generator is configured to only generate a TA command signal for a selected MT when the measured TD of a transmission received from the selected MT does not fall within a selected timing synchronization range.

8. A communication system according to claim 6 further comprising:
   a geographic locator associated with said BS controller and said BSs such that measured TD by one or more of said BS processors with respect to communication data received from a selected MT in a specified time frame provides a basis configured to calculate the geographic location of the selected MT during the specified time frame in conjunction with the TA data of a most recent successful TA command signal issued by the BS controller to the selected MT.

9. A communication system according to claim 6 further comprising:
   a plurality of mobile terminals (MTs), each having:
      a transmitter and an associated processor configured to transmit selectively formatted communication data to said BSs within system radio frames synchronized by said processor; and
      a receiver configured to receive communication data from said BSs within system radio frames; and
   each said MT processor configured to adjust the timing of communication data transmitted by said respective MT transmitter in response to TA data in a received TA command signal commencing in the time frame specified in the CFN of the received TA command signal.

10. A mobile terminal (MT) for a communication system which supports base station (BS)/mobile terminal (MT) wireless bi-directional communications via utilization of a radio frame format defined by radio frames that include a numeric identifying designation where a BS transmits selectively formatted communication data to MTs within system radio frames, including timing advance (TA) command signals which include TA data and a Connect Frame Number (CFN) specifying a particular radio frame for effectuating a timing adjustment by a MT, the mobile terminal (MT) comprising:
   a transmitter and an associated processor configured to transmit selectively formatted communication data to a BS within system radio frames synchronized by said processor; and
   a receiver configured to receive communication data from the BS within system radio frames; and
   said MT processor configured to adjust the timing of communication data transmitted by said MT processor in response to TA data in a received TA command signal commencing in the radio frame specified in the CFN of the received TA command signal.

11. A method of synchronizing communication data at a base station for a communication system supporting wireless bi-directional communications between a base station (BS) and a plurality of mobile terminals (MTs) via utilization of a radio frame format defined by radio frames that include a numeric identifying designation, where the BS transmits selectively formatted communication data to MTs within system radio frames and receives communication data from MTs within system radio frames, and at least one mobile terminal (MT) transmits selectively formatted communications data to the BS within system radio frames and receives communication data from said BS within system radio frames, the method comprising:
   a) measuring timing deviation (TD) of communication data received from a selected MT by the BS and performing the following steps when the measured TD does not fall within a selected timing synchronization range;
   b) generating a TA command signal which includes:
      TA data calculated based upon the measured TD of the communication data received from the selected MT, and
      a Connect Frame Number (CFN) specifying a particular radio frame for effectuating a timing adjustment by the selected MT;
   c) transmitting the TA command signal to the selected MT;
   d) if the TA command signal is received by the selected MT, adjusting the timing of communication data transmitted by the selected MT in response to the TA command signal based on the TA data and commencing in the radio frame specified by the CFN of the received TA command signal; and
   e) measuring the TD for communication data received from the selected MT in the radio frame specified by the CFN of the transmitted TA command signal.

12. The method of claim 11 further comprising: repeating steps b)–e) when the measured TD of a transmission received from the selected MT in step e) does not fall within the selected timing synchronization range.

13. The method of claim 12 wherein steps b)–e) are performed whenever measured TD of communication data received from the selected MT does not fall within the selected timing synchronization range.

14. A method of geographically locating a mobile terminal (MT) in a communication system having a plurality of base stations (BSs) supporting wireless bi-directional BS/MT communications via utilization of a radio frame format defined by radio frames that include a numeric identifying designation where the BSs transmit selectively formatted communication data to MTs within system radio frames and receive communication data from MTs within system radio frames and where the MTs transmit selectively formatted communications data to the BSs within system radio frames and receive communication data from said BSs within system radio frames, the method comprising:

communicating timing advance (TA) command signals to a selected MT which signals include TA data and a Connect Frame Number (CFN) specifying a particular radio frame for effectuating a timing adjustment by the selected MT;

measuring timing deviation (TD) in each CFN specified radio frame of communication data received from the selected MT by a BS to determine whether each respective command signal was successful;

measuring timing deviation (TD) of a received MT transmission from the selected MT in a selected radio frame by said BS; and using the measured TD from the selected radio frame and the TA data of a most recent successful TA command signal transmitted to the selected MT to calculate the geographic location of the selected MT.

15. The method according to claim 14 wherein timing deviation (TD) of communication data received for the selected MT by a second BS in the selected radio frame is measured and also used in the calculation of geographic location of the selected MT.

16. The method according to claim 15 wherein timing deviation (TD) of communication data received for the selected MT by a second BS in the selected radio frame is measured and also used in the calculation of geographic location of the selected MT.

17. The method according to claim 14 wherein the selected MT measures relative frame reception difference between cells and the cell reception difference measurements are also used in calculating geographic location.

* * * * *

UNITED STATES PATENT AND TRADEMARK OFFICE
CERTIFICATE OF CORRECTION

PATENT NO. : 7,023,835 B2
APPLICATION NO. : 09/826464
DATED : April 4, 2006
INVENTOR(S) : Stephen E. Terry It is certified that error appears in the above-identified patent and that said Letters Patent is hereby corrected as shown below:

At column 1, line 46, before "MT", delete "a" and insert therefor --an--.

At column 1, line 49, before "MT", delete "a" and insert therefor --an--.

At column 2, line 65, after the word "triangulation", insert --of--.

At column 3, line 36, after the word "less", delete "the" and insert therefor --than--.

At column 3, line 67, after the word "faster", delete "then", and insert therefor --than--.

At column 4, line 55, after the word "only", delete "generates" and insert therefor --generate--.

At column 5, line 11, after the word "processor", delete "adjust" and insert --adjusts--.

At column 6, line 54, after the word "invention", insert --.--.

At column 7, line 57, after the word "respect", insert --to--.

At column 8, line 9, after the word "command", delete "the advance the" and insert therefor --an advance of the--.

At column 8, line 21, after the word "determining", insert --if a--.

At column 9, line 7, after the words "case of", delete "a" and insert therefor --an--.

At column 9, line 24, before the words "a previously" delete "is".

At column 9, line 40, after the word "based", insert --on--.

At claim 3, column 10, line 53, after the word "communication", delete "date" and insert therefor --data--.

UNITED STATES PATENT AND TRADEMARK OFFICE
CERTIFICATE OF CORRECTION

PATENT NO. : 7,023,835 B2
APPLICATION NO. : 09/826464
DATED : April 4, 2006
INVENTOR(S) : Stephen E. Terry It is certified that error appears in the above-identified patent and that said Letters Patent is hereby corrected as shown below:

At claim 10, column 11, line 66, after the word "by", delete "a" and insert therefor --an--.

Signed and Sealed this

Twenty-eighth Day of November, 2006

JON W. DUDAS
*Director of the United States Patent and Trademark Office*